United States Patent Office 3,479,060
Patented Nov. 18, 1969

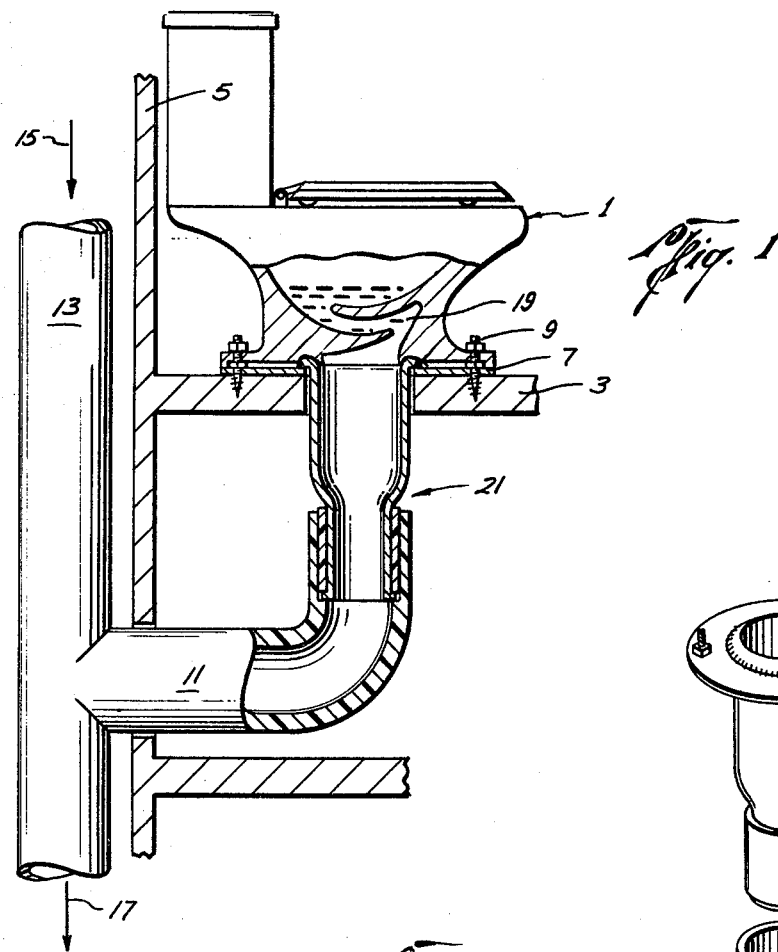
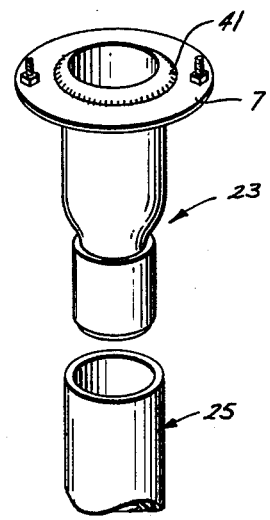
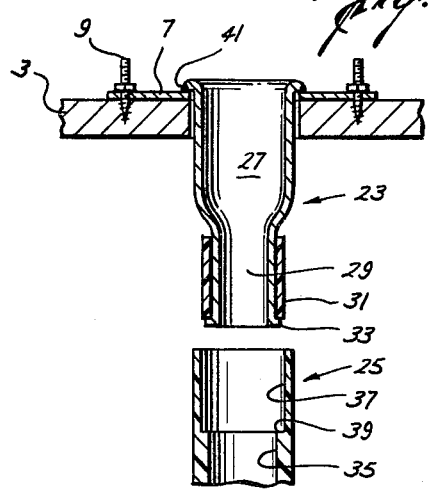
Sidney O. Westbrook
Lewis D. Mickley, Jr.
INVENTORS
BY Arnold and Roylance
ATTORNEYS

3,479,060
PLUMBING CONNECTION
Sidney O. Westbrook, 522 Bizerte 77022, and Lewis D. Mickley, Jr., 5095 Cedar Creek 77027, both of Houston, Tex.
Filed May 13, 1966, Ser. No. 550,009
Int. Cl. F16l 55/00, 47/00
U.S. Cl. 285—58             2 Claims

ABSTRACT OF THE DISCLOSURE

This application discloses a connection arrangement as used for coupling the waste drain of a toilet to a plastic pipe beneath the floor. The connection includes a section of lead pipe having a reduced diameter at its lower end with a plastic sleeve surrounding the reduced-diameter portion. The plastic pipe receives the reduced-diameter portion at its upper end, this pipe being of standard OD but having a section of increased ID at the upper end to receive the plastic sleeve. The lower end of the lead pipe is flanged out to hold the plastic sleeve in place. The upper end of the lead pipe may be turned down over a flange.

---

This invention relates to a connection useful in making plumbing joints and more particularly to a slip-type connection or adapter suitable for joining a drain to a plastic pipe through a wall, such as in the case of making connection to the waste drain of a toilet.

A "plumbing" connection as used herein refers not only to connections of water lines, gas lines, sewer lines and the like common in homes and buildings, but refers generally to connecting pipe, such as in connecting lines for carrying hydrocarbons in a chemical plant or as in connecting conduits carrying electrical or telephone wiring. In fact, wherever it is desired to join a plastic pipe using a lead connecting section, the connection described herein may be used.

In making a toilet installation it has heretofore been the practice to use all metal or metal-and-rubber connectors employing the usual compliant gasket for making the junctions between the pipe or line running in the wall or floor and the drain from the bowl of the toilet. Typically, in such an installation, a hole is knocked in the floor, a metal (e.g., cast iron) pipe connector is coupled through the floor to the receiving pipe or line section (such coupling normally either utilizing compliant gaskets, metal clamps and bolts or utilizing cast threaded pipe ends, gaskets and collars), the hole around the metal pipe connector is then filled in with grout material, such as sealing wax or putty, the toilet base is placed over the upwardly extending end of the pipe connector such that the drain fits therein, and the base (generally having a gasket arrangement for sealing the upwardly extending end against seepage onto the floor) is bolted into place.

Should the upwardly extending end of the pipe connector be too high, should the hole not be quite opposite the receiving pipe or should the location of the hole be such that the toilet base is not at the desired position, inconvenient and time-consuming reinstallation is required.

In addition, it should be noted that the connecting metal sections used heretofore have all been rigid. Therefore, should the initial hole in the wall or floor be in slightly the wrong location, the most expeditious way of ensuring alignment of drain and receiving pipe or of repositioning the base of the toilet is by making the hole larger. Such enlarged holes result in a weaker installation than normal. Moreover, in not a few instances, such as installation leaves a partial hole that cannot be completely covered by the placement of the toilet base. The opening left in the floor and, even often being hidden by some external covering, the unsightliness of such as installation is a problem that has perplexed the building trade.

With the advent of the use of plastic pipe for the pipes or lines running within walls and floors in the building of both homes and buildings, essentially no change has occurred in the procedures of connecting such lines or pipes to fixtures, such as toilet drains. In such a plastic pipe installation, in addition to the shortcomings described above, tightening a metal connection section (the section secured to the drain) to a plastic pipe often results in fracturing the pipe. Also, effecting a tight seal between the cast iron metal pipe normally employed and plastic has been a considerable problem. The continued use of grout materials and gaskets has resulted in notorious weaknesses in the installation requiring frequent replacement of parts.

The connection presented herein eliminates the problems existing in the above-described connections by providing generally an easily-workable connecting section made of lead for location in association with the waste drain of a plumbing fixture. This connection provides a section that may be trimmed to the desired outwardly extending dimension (even while in place) and then outwardly turned and soldered to a closet flange, thereby effectively sealing the wall or floor opening without the necessity for grouting. At the same time, the lead material is sufficiently deformable without fracturing or cracking to allow mating with a pipe end not perfectly aligned with the floor or wall hole or to allow a certain adjustment of the toilet position.

The preferred embodiment of the lead connector also includes a surrounding plastic collar press fitted thereto that is readily bondable to the receiving plastic pipe. If desired, however, the mating surfaces of the depending lead connecting section and the plastic pipe may be made to accept each other in press-fit engagement without the use of bonding material. A limit shoulder inside the receiving plastic pipe may be included for determining the axial placement of the lead section within the pipe. Such an installation also frees the contiguous surface of the pipe and lead section from internally restricting projections, thereby satisfying the normal building restrictions.

Therefore, one general object of the present invention is to provide an improved plumbing connector for joining a drain from a plumbing fixture, such as a toilet waste drain, to a plastic pipe.

Another object of the present invention is to provide an improved plumbing connector for joining a drain from a plumbing fixture to plastic pipe using a readily deformable section to minimize, if not eliminate, reinstallation problems inherent with rigid plumbing section installations.

Yet another object of the present invention is to provide an improved plumbing connector for joining a drain from a plumbing fixture to plastic pipe through a hole in a wall which eliminates the use of gaskets and grout material formerly used in such installations, these previously used materials being much more subject to wear and deterioration than the parts employed in the present invention.

Still another object of the present invention is to provide an improved plumbing connector for joining a drain from a plumbing fixture that employs a plastic-to-plastic connection that is readily bondable while still retaining the advantages of a metal part that is easily workable at an on site location and which is weldable to a metallic closet flange.

In order that the manner in which these and other objects that will be readily apparent are attained in accordance with the invention can be understood in detail, reference is had to the accompanying drawings which form a part of this specification. It is to be noted, however, that these drawings illustrate only a typical embodiment of the invention and therefore are not to be considered limiting of its scope, for the invention may admit to other equally effective embodiments.

In the drawings:

FIG. 1 is a plan view, partially in cutaway section, of a typical installation employing the invention, FIG. 2 is an oblique view of an embodiment of the invention, and FIG. 3 is a section view of the embodiment of the invention shown in FIG. 2.

Referring now to the drawings and first to FIG. 1 a typical plumbing fixture in the form of a toilet 1 is shown which may be secured by use of the present invention. Typically, toilet 1 is secured to floor 3 and is backed against or adjacent side wall 5. Standardly, the toilet is mounted to the floor via a brass closet flange 7 and bolted to the floor with bolts 9.

Running within floor or bottom wall 3 is a plastic pipe 11, which, in turn, attaches within side wall 5 to a vertical plastic pipe 13. Pipe 13 is usually vented at a vent 15 to the roof and has a disposal or waste opening at the lower end 17. The embodiment of the invention to be discussed below, connection 21, is located between drain 19 leading from the bowl of toilet 1 and the upwardly turned receiving end of plastic pipe 11, typically turned via a terminating elbow to the receiving position beneath the toilet bowl.

Connection 21 generally comprises a lead section 23 for mating with the waste drain from the toilet bowl and for attaching to the closet flange as explained below and a specially shaped receiving pipe end 25 of the plastic pipe to which connection is made. This pipe end may either be a specially made terminating end section placed on the pipe immediately adjacent the making of a plumbing fixture connection, an ordinary end (provided the running sections of plastic pipe are joined using such shaped ends in a manner similar to the connection described herein for making a plumbing connection), or an ordinary end section modified at the location in a manner to accomplish the desired shape.

Lead section 23 includes two general parts, viz., an upper part 27 and a reduced lower extending part 29. In the manufacture of such a section, a lead pipe having a diameter equal to part 27 is typically spun down on one end to form part 29. Other manufacturing methods, of course, are available.

A collar 31 is then placed around the reduced lower extending part so as to leave a slightly exposed lead part at the lower end beneath the collar. This collar is typically made of the same plastic material as the material of which the plastic pipe is made, so as to provide easy bonding.

It should be noted that pipe materials commonly in use are acrylonitrile-butadiene-styrene (ABS), polyvinylchloride (PVC) and high impact base compact styrene, although other materials are used to a lesser extent and yet additional materials are likely to be used in the future.

Part 29 is then swaged outwardly from the inside to effect a press fit between the lead section and the collar. To further ensure against axial movement and eventual displacement of the collar with respect to part 29, the extreme or exposed part of part 29 extending beneath the collar is turned outwardly to form a lip 33. Lip 33 may then be ground to form a smooth surface and to prevent burrs from extending radially past the outside surface of the collar.

Receiving or joining section 25 of the plastic pipe has a regular inside diameter 35 equal to the inside diameter of part 29 of the lead section just described. This is also most likely the regular inside diameter of the pipe. However, at the insertion end of part 25, the diameter 37 is enlarged sufficiently to snugly receive the outside diameter of collar 31. Between reduced diameter 35 and enlarged diameter there is formed preferably a transverse or radial shoulder 39, establishing the limit position of part 29 with collar 31. The axial location of this shoulder from the entering end is such so as to allow an appreciable area of collar 31 to be located within pipe 25 upon full insertion.

After or upon insertion a bonding solvent material suitable for chemically welding the plastic collar and pipe together is used to secure the connection. For instance, when ABS material is used for the plastic pipe and collar, methylethylketone may be used as the bonding solvent for chemically welding or cementing the two parts together.

It should be noted that a fitting without the use of bonding material may be made by providing an effective press fit between collar 31 and diameter 37.

As evident from the diameters of part 29 and section 25 at diameter 35, when the sections are fully together in the manner described above there will be a contiguous internal surface area with a complete absence of internal projections therein, thereby satisfying the most stringent of building restrictions as to this feature.

In making an installation, generally a closet flange 7 is located on the fixture side of floor 3 encircling a hole knocked in the floor opposite the upturned end of the receiving plastic pipe and secured by a bolt-washer-and-nut arrangement in conventional manner. The closet flange normally completely and concentrically encircles the floor hole, although occasionally flanges may be made that only partly surround the hole. The lead section 23 is then inserted through the opening in the flange and the opening previously knocked in the floor and coupled to the plastic pipe as previously described. The exposed outwardly extending end of the lead section is then cut off or trimmed at an appropriate height for the drain from the fixture to fit snugly therein a distance to prevent leakage and still allow a little extra to be turned over to form a junction with the closet flange in the manner to be described.

In making the lead section-to-closet flange connection, the lead pipe is merely turned outwardly in all directions and downward into contact with the flange material. The point of contact is then secured and sealed by weld 41 completely around the periphery of the junction. If a flange is used which does not completely close, then the weld also is made to close the gap in the flange. Such a welding seal effectively shields the floor hole and area around the hole from the drain pipe without the use of gaskets or grout.

It should be noted that in describing the making of the connection, it has been assumed that the upturned section of the pipe was in perfect alignment with the hole knocked in the floor and that the hole was in perfect position for locating the fixture in the desired position. In actual practice, such may not be the case.

In the upturned section of the plastic pipe is not perfectly in line with the hole in the floor for making an easy connection in the manner above described, the lead section can usually be bent, turned or shifted sufficiently without impairing the efficiency of the connection and without expending a great deal of effort and time in making the necessary adjustments.

Likewise, if the fixture is initially a little out of position, it is normally possible on the fixture side of the connection to allow for slight relocation during a test fitting and prior to the trimming and welding steps of the installation.

While only one embodiment of the invention has been described, it is obvious that various substitutes or modifications or structure may be made.

We claim:

1. A plumbing connection for joining plastic pipe to a drain through a wall opening, comprising a flange located on the drain side of the wall and having an opening concentric with the wall opening, said flange opening positioned opposite the drain,
a lead pipe section including
an enlarged end passing through said wall opening and said flange opening into receiving position with the drain, the lip of said enlarged end being turned outwardly into contact with said flange and soldered thereto, and
a reduced extension having an outwardly turned lip thereon,
a collar snugly surrounding said reduced extension of the lead pipe section in press-fitting connection therewith, said collar also being held from axial movement from said reduced extension by said lip,
said collar being made of a material suitable for bonding to the plastic pipe,
a joining section of the plastic pipe having an enlarged receiving internal diameter snugly receiving in mating engagement said collar upon insertion thereof,
said internal diameter of said joining section reducing to the internal diameter of the plastic pipe, thereby forming an internal shoulder mating with the end of said outwardly turned lip on the reduced extension of the lead pipe section, at an axial distance from the receiving end of said joining section to determine the limit of the axial placement of said lead pipe, and
bonding means securing the connection between said collar and said joining section of plastic pipe.

2. A plumbing connection for joining plastic pipe to a drain through a wall opening, comprising
a flange located on the drain side of the wall and having an opening at least partially in register with the wall opening, said flange opening positioned opposite the drain,
a lead pipe section including
an enlarged end passing through said wall opening and said flange opening into receiving position with the drain, the lip of said enlarged end being turned outwardly into contact with said flange and soldered thereto, and
a reduced extension having an internal diameter substantially equal to the internal diameter of the plastic pipe and an outwardly turned lip thereon,
a collar snugly surrounding said reduced extension of the lead pipe section in press-fitting connection therewith, said collar also being held from axial movement from said reduced extension by said lip,
said collar being made of a material suitable for bonding to the plastic pipe,
a joining section of the plastic pipe having an enlarged receiving internal diameter snugly receiving in mating engagement said collar upon insertion thereof,
said internal diameter of said joining section reducing to the internal diameter of the plastic pipe, thereby forming an internal shoulder mating with the end of said outwardly turned lip on the reduced extension of the lead pipe section at an axial distance from the receiving end of said joining section to determine the limit of the axial placement of said lead pipe, the internal surface of said reduced extension and said plastic pipe being substantially contiguous and free of internal projections, and
bonding means securing the connection between said collar and said joining section of plastic pipe.

References Cited

UNITED STATES PATENTS

| | | | |
|---|---|---|---|
| 393,684 | 11/1888 | Berryhill | 285—374 X |
| 3,262,718 | 7/1966 | Draudt | 285—242 X |
| 911,486 | 2/1909 | Foulois | 285—58 |
| 1,609,159 | 11/1926 | Dawson | 285—58 |
| 1,793,681 | 2/1931 | Crowell | 285—58 |
| 1,988,298 | 1/1935 | Burkett | 285—58 |
| 2,776,151 | 1/1957 | Harkenrider | 285—238 |

FOREIGN PATENTS 87,734   3/1958   Netherlands.

REINALDO P. MACHADO, Primary Examiner

W. L. SHEDD, Assistant Examiner

U.S. Cl. X.R.

285—174, 286, 287, 423